United States Patent
Vanore

(10) Patent No.: US 7,942,333 B2
(45) Date of Patent: May 17, 2011

(54) IC CARD SECURE PERSONALIZATION METHOD

(75) Inventor: Agostino Vanore, San Marco Evangelista (IT)

(73) Assignee: Incard SA, Geneva (CH)

( * ) Notice: Subject to any disclaimer, the term of this patent is extended or adjusted under 35 U.S.C. 154(b) by 1022 days.

(21) Appl. No.: 10/590,247

(22) PCT Filed: Jul. 28, 2005

(86) PCT No.: PCT/EP2005/008201
§ 371 (c)(1),
(2), (4) Date: May 29, 2007

(87) PCT Pub. No.: WO2006/010617
PCT Pub. Date: Feb. 2, 2006

(65) Prior Publication Data
US 2008/0035737 A1    Feb. 14, 2008

(30) Foreign Application Priority Data

Jul. 30, 2004   (EP) .................................. 04018182

(51) Int. Cl.
*G06K 19/06* (2006.01)
(52) U.S. Cl. ........................ 235/492; 235/380
(58) Field of Classification Search .................. 235/492, 235/380
See application file for complete search history.

(56) References Cited

U.S. PATENT DOCUMENTS

| | | | | |
|---|---|---|---|---|
| 4,105,156 | A | 8/1978 | Dethloff | 235/441 |
| 6,402,028 | B1* | 6/2002 | Graham et al. | 235/380 |
| 6,729,549 | B2* | 5/2004 | Hamann et al. | 235/492 |
| 6,971,025 | B1* | 11/2005 | Droege et al. | 726/26 |
| 2001/0032885 | A1* | 10/2001 | Groeger | 235/492 |
| 2004/0099730 | A1* | 5/2004 | Tuchler et al. | 235/380 |
| 2004/0256451 | A1* | 12/2004 | Goman et al. | 235/380 |
| 2008/0116261 | A1* | 5/2008 | Gebhardt et al. | 235/380 |

FOREIGN PATENT DOCUMENTS

| | | |
|---|---|---|
| DE | 10142351 | 3/2003 |
| EP | 0955603 | 11/1999 |
| EP | 0957461 | 11/1999 |

* cited by examiner

*Primary Examiner* — Ahshik Kim
(74) *Attorney, Agent, or Firm* — Lisa K. Jorgenson; Allen, Dyer, Doppelt, Milbrath & Gilchrist, P.A.

(57) ABSTRACT

A method for an entity different than a manufacturer of an integrated circuit (IC) card to perform a secure personalization phase of the semi-finished IC card is provided. The semi-finished IC card includes a non-volatile memory storing an algorithm for processing data as a finite-state machine, and enabling the entity different from the IC card manufacturer to access the algorithm for storing personalization data and information in the non-volatile memory. The method includes performing a security authentication before enabling the algorithm to receive the personalization data and information, enabling the algorithm to receive the personalization data and information, and storing the personalization data and information in secret memory locations in the non-volatile memory according to a data structure and an access procedure hidden to the entity different from the manufacturer of the integrated circuit card. The enabling and storing may be repeated if the personalization data and information were not correct.

27 Claims, 5 Drawing Sheets

APPLICATION FIELD #1

APPLICATION FIELD #2

IC CARD SECURE PERSONALIZATION METHOD

FIELD OF THE INVENTION

The present invention relates to an integrated circuit (IC) card that allows for specific personalization thereof. More specifically, the invention relates to a method for completing the manufacturing phases of an IC card, such as performing a final and secure personalization phase of a semi-finished IC card including a non-volatile memory in which the personalization data and information are stored in secret allocations.

In the following, reference will be made to an IC card for specific purpose applications, such as to telephones. Also, the term smart card is used as an alternative to IC card, but without limiting the scope of protection of the present invention.

BACKGROUND OF THE INVENTION

Typically, IC card manufacturing steps include a set of phases each having a well defined purpose in terms of providing a specific characterization or functionality to the card. A first phase regards a functional configuration of the card while a last phase relates to a personalization phase. This personalization phase requires storing specific secret data and information in the smart card non-volatile memory to allow proper operation of the card in the designated application field.

The stored information identifies each smart card. The physical location in the non-volatile memory, where all data are stored, is an industrial secret of the manufacturer and is normally not within the scope of being standardized. As an example, the GSM communication standard defines the concept of authentication keys but does not standardize where the keys are to be stored on the card or the format representing and protecting such keys.

The methods for data storing should ensure secrecy of the memory location. In the IC card manufacturing steps, two different working states can also be distinguished that may be defined as ADMINISTRATIVE and SECURED.

In the ADMINISTRATIVE state a set of commands is available for the user or administrator to perform the functional configuration, accessing to each position in the smart card non-volatile memory. In the ADMINISTRATIVE state, free access to the memory ensures that the personalization process can be performed for storing all required data in known locations. The ADMINISTRATIVE state is also an intermediate state in which the smart card can stay for further production steps.

Only at the end of the production process will the smart card be placed in the SECURED state. The SECURED state is a final state in which the smart card is passed from the manufacturer to the customer. All secret data stored in the non-volatile memory of the card cannot be freely accessed anymore. If, for any reason, the personalization process is not performed by the manufacturer, it cannot be performed anymore.

FIG. 1 is a schematic view showing the action steps performed to reach the secured state from the administrative state. These steps are performed by the same manufacturer. This situation may be considered a restriction for providing a semi-finished production by a smart card manufacturer, since the final personalization in the secured state cannot be performed outside the factory. Therefore, this is a strong limitation to the possibility of supplying outside a predetermined number of micro-modules, that is, unfinished IC cards not yet protected in the secured state.

In such a case, when the personalization process should be performed by another organization or company, the only possibility to implement the personalization phase would be that of disclosing industrial secrets regarding the memory locations and the manner in which the card stores secret data.

Any disclosure of industrial secrets obviously need to be avoided by any smart card manufacturer. A known approach for providing personalization of an IC card is disclosed in U.S. Pat. No. 4,105,156 concerning an identification card with interior circuits and a memory for use in a credit or identification system.

This approach is specifically provided for bank services wherein a personal identification number, i.e., a PIN, is associated to a semi-finished IC card including a non-volatile memory portion. This personalization phase is performed by a user, generally a bank entity, by entering the PIN through a write/reader device of the IC card including an encoder. The PIN is fed into a memory through gates that are automatically destroyed so that the association between the card and the PIN can no longer be changed.

This hardware approach has the drawback that a wrong PIN or a wrong personalization code cannot be changed after the personalization enabling procedure is started. In other words, once the secret memory locations are used to store the personalization data, access to such memory locations is physically interrupted according to the teaching of the above U.S. patent.

Currently, personalization of IC cards are much more complex than a simple association of a PIN or code number. The hardware system disclosed in U.S. Pat. No. 4,105,156 would not be appropriate in large volumes of data and/or information required for the personalization step. A wrong instruction provided during the personalization phase would render a large number of IC cards inoperable. This corresponds to high costs being supported by the final user.

Therefore, it would be highly desirable for the final user to implement a personalization phase that could be defined in all possible details up to the last step of the personalization phase without destroying the possibility to re-program such a personalization phase. At the same time, the manufacturer of the IC is interested in offering to the final user a product having secret memory locations available for the personalization phase.

SUMMARY OF THE INVENTION

An object of the present invention is that of allowing implementation of the IC card personalization step outside the organization or company performing the IC card manufacturing, but allowing at the same time the personalization phase to be re-programmed if needed.

Another object of the present invention is that of allowing a correct and secure personalization phase to be performed by an organization or company not having access to information concerning the manner in which the card stores secret data.

According to a first embodiment of the personalization phase, a method comprises storing an algorithm in the non-volatile memory for processing data as a finite-state machine, and enabling an entity different from the card manufacturer to access the algorithm for storing all necessary data and information required by the personalization phase according to a designated application field of the IC card. A security authentication step may be performed before enabling the algorithm to receive the data and information.

The algorithm may be enabled to receive the data and information, which are stored in secret memory locations of the non-volatile memory portion according to a predetermined data structure and an access procedure hidden to the entity. The enabling phase of the algorithm is allowed in the case of an incorrectly enabled personalization phase.

BRIEF DESCRIPTION OF THE DRAWINGS

The features and advantages of the personalization method according to the present invention will be disclosed in the following description given by way of non-limiting illustrative examples with reference to the drawings.

DETAILED DESCRIPTION OF THE PREFERRED EMBODIMENTS

Figure 2:
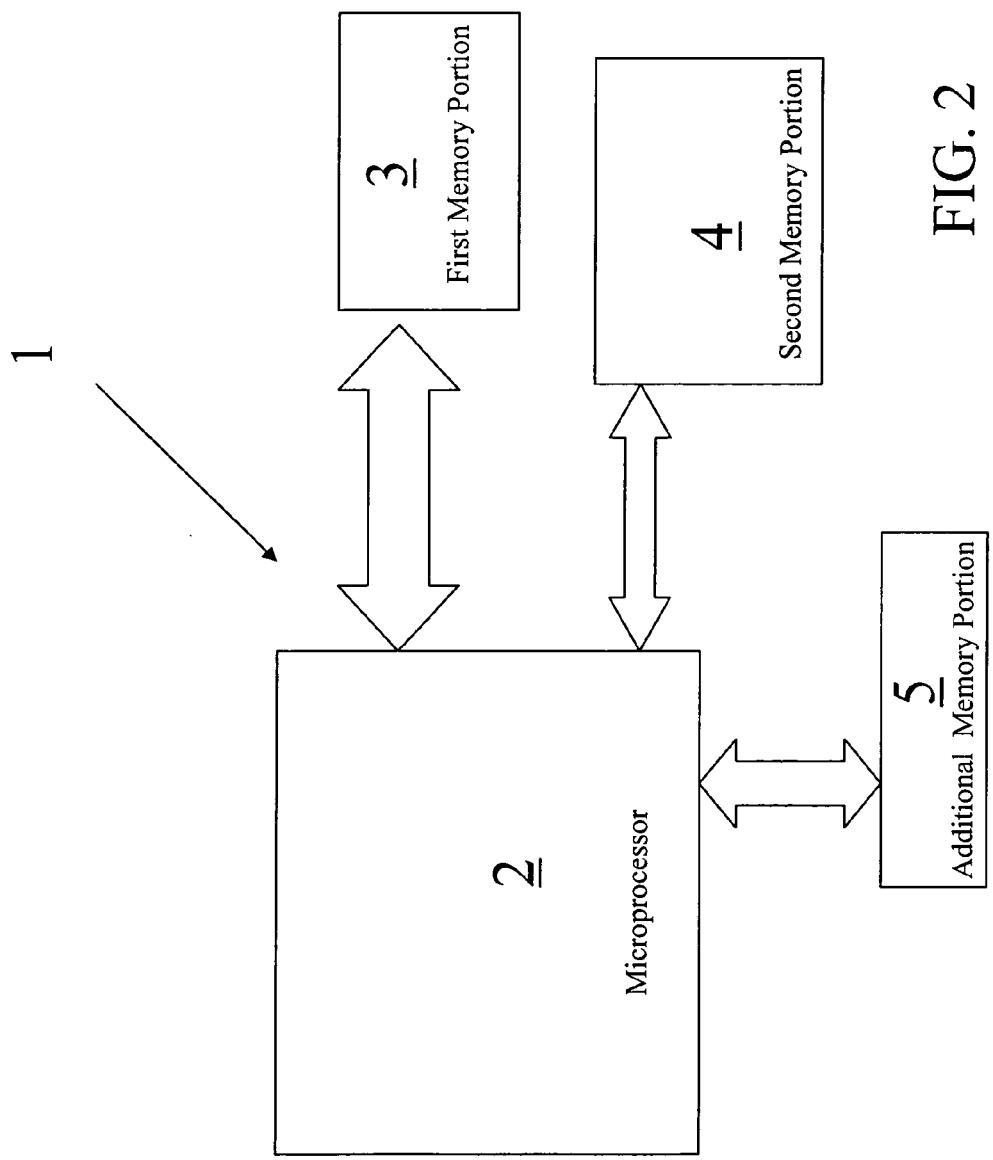
FIG. 2 is a schematic view of an IC card system including integrated circuit portions implementing the method according to the present invention.

With reference to the figures, and more specifically to the example of FIG. 2, an IC card 1 according to the present invention is schematically shown. The IC card 1 includes means (FIG. 4) for allowing a final personalization step to be performed by an organization or company different from the manufacturer of the card.

A method completes the manufacturing phases of an IC card for performing a final and secure personalization phase of a semi-finished IC card including a non-volatile memory portion in which personalization data and information are stored in secret allocations.

The IC card 1 may have the format and external shape of a common SIM card for mobile telephone applications. However, nothing prevents the IC card 1 from having a different shape or format as may be required by a specific application. The IC card 1 includes a conventional microcontroller 2 or microprocessor and conventional memory portions 3, 4 and 5 which are strictly associated with the microcontroller 2.

The microcontroller 2 and the associated memory portions may be an integrated embedded system equipped with a first read only memory portion 3, a second or extended non-volatile memory portion 4 and at least one additional memory portion 5.

The first memory portion 3 is generally a ROM memory including programs, i.e., software applications, masked on the read-only memory and defining the function of the IC card 1. The second and extended memory portion 4 is a non-volatile memory and may be an electrically erasable memory, such as an EEPROM or Flash normally having a NOR structure and including subroutines, extended instructions and/or customized data.

The additional memory portion 5 may be structurally and functionally independent from both the first read only memory portion 3 and the extended memory portion 4, and may be a read/write memory such as a volatile RAM. As an alternative, the additional memory portion 5 may also be an EEPROM or another non-volatile memory device.

The IC card 1 may be considered a semi-finished product since the final personalization phase is missing from the card. However, the IC card 1 includes means for allowing an external source implementing this final personalization phase that depends on the application field. In other words, the application field involves different personalization commands or methods, and different memory locations on where to store secret data and information.

A method for performing the personalization phase on the smart card in the secured state is also provided. The method allows the smart card personalization phase to be performed by an organization or company not having access to information concerning the manner in which the card stores the secret data.

To do so, the method provides an abstract of the data stored in the non-volatile smart card memory portion. In other words, knowledge of the data location is hidden for the entity performing the final personalization phase.

The method is characterized by the following steps. An algorithm is stored in the non-volatile memory portion 4 for processing data as a finite-state machine 10. An entity different from the card manufacturer is enabled to access the algorithm for storing all necessary data and information required by the personalization phase, according to a designated application field of the IC card.

The algorithm is enabled to receive the data and information which are stored in memory locations of the non-volatile memory portion according to a predetermined data structure and an access procedure hidden to the entity. The memory location knowledge for the data storing is a prerequisite for allowing the operation to be performed. This knowledge depends on the application field, and it also characterizes the smart card product.

Figure 1:
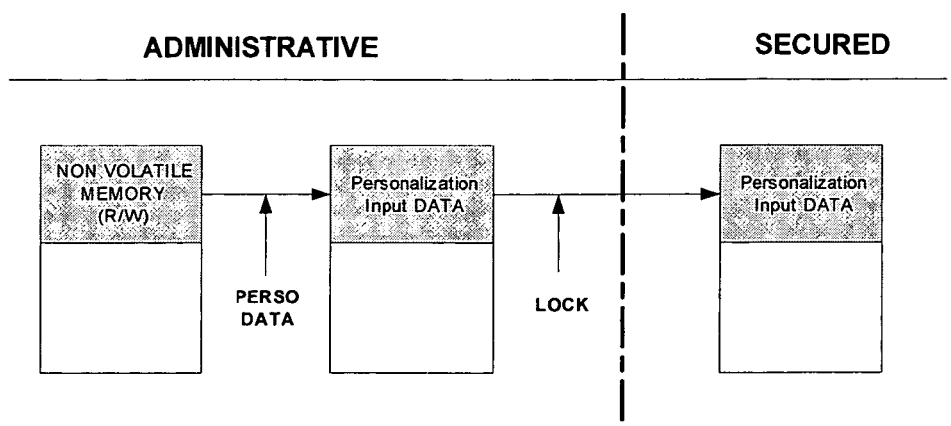
FIG. 1 is a schematic view showing the action steps performed to reach the secured state from the administrative state as performed by a same manufacturer according to the prior art.
Figure 3:
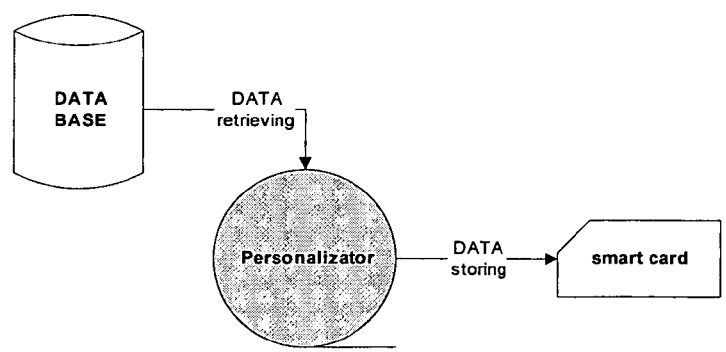
FIG. 3 is a schematic view of a personalization phase performed by an entity different from the manufacturer of the IC card according to the present invention.

FIG. 3 shows the different personalization processes depending on the application field. The application field involves different personalization commands or methods, and different memory locations where the data is to be stored.

The different personalization commands corresponding to different memory locations on where to store data are included in the non-volatile memory portion. Moreover, personalization data are stored in the card during the personalization phase without any knowledge by the entity different from the card manufacturer about the location where the data will be stored. This is obtained by a process performed by the state machine 10 taking care of the data storing, but not showing any information about the data location. This provides a process independent from the smart card application field.

Figure 5:
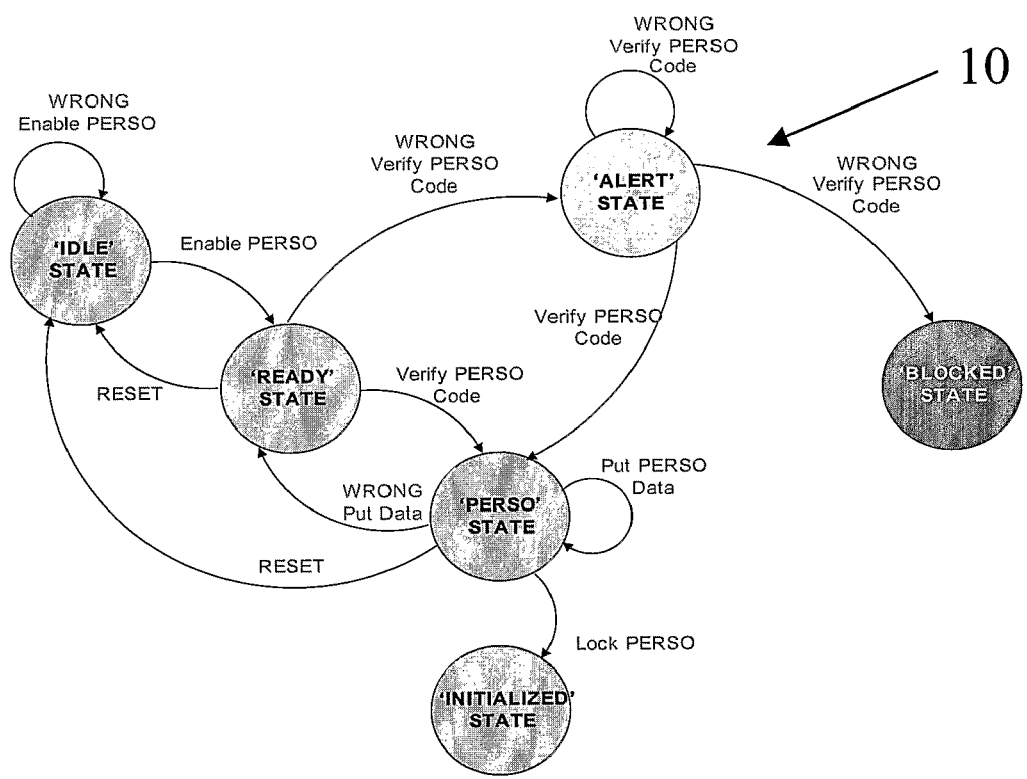
FIG. 5 is a schematic view showing a finite-state machine stored in a non-volatile memory portion of the IC card of FIG. 2.
Figure 6:
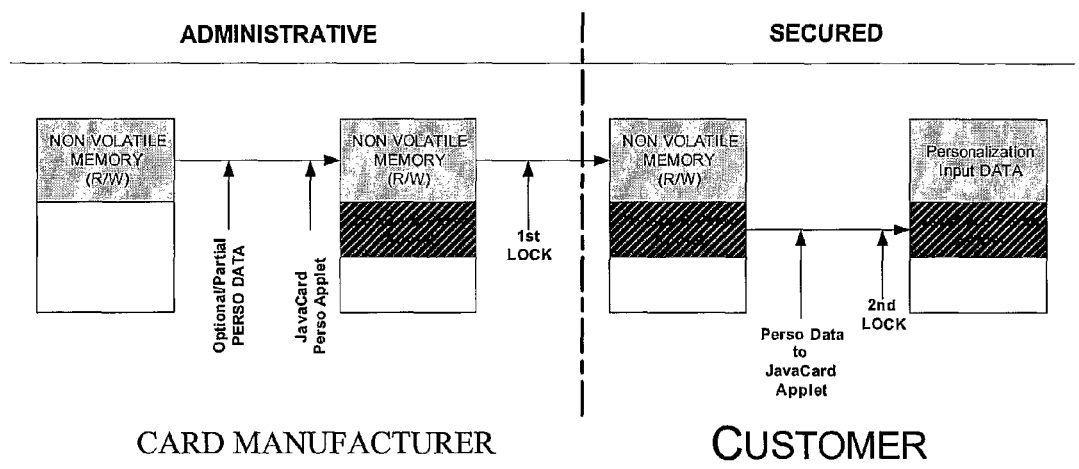
FIG. 6 is a schematic view showing a JavaCard applet loaded into the IC card of FIG. 2 during an administrative phase.

The method steps are identified by the processing of a finite-state machine 10 as shown in FIG. 5. A beginning state (IDLE state) corresponds to the SECURED state at the end of all personalization and end production steps.

The transitions from one state to another state may be activated by predetermined events that are listed as follows: Personalization Process Enabling, Security Authentication, Data Sending, and Personalization Completion.

Each event is triggered by a command sent to the smart card microprocessor 2. The commands are as follows, wherein the term PERSO means personalization: ENABLE PERSO, VERIFY PERSO CODE, PUT PERSO DATA, and LOCK PERSO.

Figure 4:
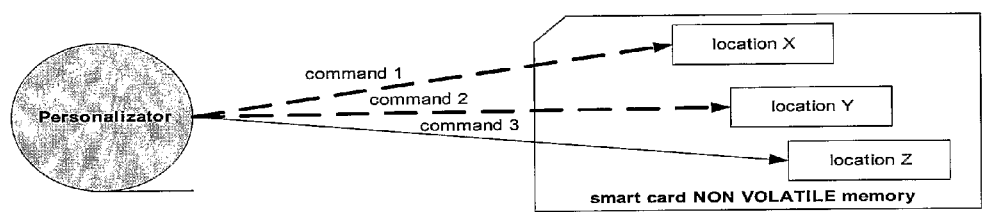
FIG. 4 is a schematic view showing different personalization process steps based on the application field and involving different personalization commands or instructions and different memory locations for storing data according to the present invention.
Figure 4:
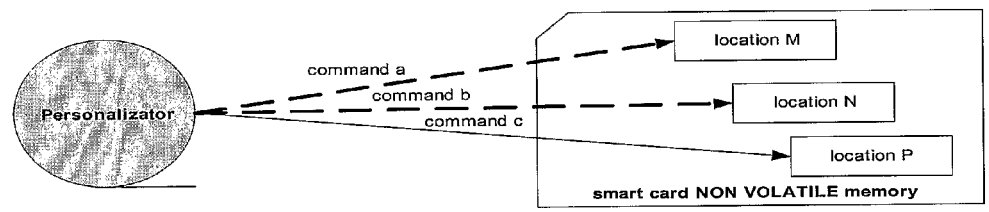

At the beginning of the personalization process, the card 1 is in the IDLE state, ready for receiving one of the above commands. This is the starting point for the personalization process, and the smart card will return to this initial state every time after a reset command, as shown in FIG. 4.

An ENABLE PERSO command allows the transition on the READY state. In this READY state the smart card 1 has been enabled to receive the commands specified for the data personalization. When the card 1 is in this READY state an authentication command shall be evaluated before sending data for security reasons. This is shown in FIG. 4 by the verify steps.

The READY state is a transition state, and only the VERIFY PERSO CODE command will be accepted. Upon receiving the right input code, the state will be changed in the PERSO state. While in case of receipt of a wrong code, the new state will be an ALERT state. The ALERT state is another transition state and only the VERIFY PERSO CODE command will be accepted.

Upon receiving the right input code the new PERSO state will be reached, but after some attempts receiving a wrong PERSO code the new state will be BLOCKED. The BLOCKED state is an irreversible state, and the smart card 1 cannot be personalized anymore and needs to be discharged.

After a VERIFY PERSO CODE is successfully performed, the PERSO state will be reached and the data can be sent to the smart card 1 through the PUT PERSO DATA commands. It could be possible to send a sequence of the PUT PERSO DATA command with different formats for the personalization completion.

When all the personalization data have been stored in the smart card non-volatile memory portion 4, the last command to send is the LOCK PERSO command. The LOCK PERSO state ends the personalization process, and represents an irreversible software lock to the personalization data of the IC Card The method may be based on a JavaCard applet loaded into the smart card 1 during the ADMINISTRATIVE phase, as schematically shown in FIG. 5. After the first LOCK the IC card 1 passes to the SECURED state. Then, the personalization data can be stored by the customer only via the personalization applet.

The personalization applet allows implementation of the steps described above, providing the abstract for the data being stored in the non-volatile smart card memory portion 4.

The method has the advantage of allowing the final user to implement a personalization phase that could be defined in all possible details up to the last step of the personalization phase without destroying the possibility to re-program such a personalization phase. At the same time the manufacturer of the IC card 1 may offer to the final user a product having secret memory locations available for the personalization phase.

The personalization phase is performed through commands that are able to access the secret memory locations without indicating specific additional parameters. These accesses reinforce the security policy of the smart card 1 because, not indicating specific additional parameters to access memory locations, is a significant improvement to mask the internal memory organization and file system of the smart card 1.

The algorithm that implements the described process is stored on the IC card 1 already compliant to the standards. The memory for storing the information may be referred to as a logical model. This model could be a file system that is an abstraction of the memory physical layer.

The memory locations could be represented by all the available files, each one identified by the ID. The information are then stored in the files. The target is the file ID hiding during the personalization process of the semi-finished product performed by the user.

Furthermore, the information stored in the files have a typical format that needs to also be hidden to the entity that performs the personalization process. The algorithm loaded on the IC card 1 implements the described abstraction layer (file ID and file format hiding), managing only the data to store without reference to the file ID or any file body format.

The secure personalization process is also different from the prior art because it is reversible after each data storing. The process is finished, and not reversible, only if formally required (see LOCK PERSO command in FIG. 5). For this reason each data stored could be replaced, one or more times, before the formal request for ending the process.

That which is claimed:

1. A method for an entity different than a manufacturer of an integrated circuit card to perform a secure personalization phase of the semi-finished integrated circuit card, the integrated circuit card comprising a non-volatile memory storing an algorithm for processing data as a finite-state machine and enabling the entity different than the manufacturer of the integrated circuit card to access the algorithm for storing personalization data and information in the non-volatile memory required by the secure personalization phase according to a designated application field of the integrated circuit card, the method comprising:

performing a security authentication before enabling the algorithm to receive the personalization data and information;

enabling the algorithm to receive the personalization data and information;

storing the personalization data and information in secret memory locations in the non-volatile memory according to a data structure and an access procedure hidden to the entity different from the manufacturer of the integrated circuit card; and repeating the enabling and storing if the personalization data and information were not correct.

2. A method according to claim 1 further comprising storing in the non-volatile memory different personalization commands corresponding to different memory locations.

3. A method according to claim 1 wherein the integrated circuit card comprises a microprocessor; and wherein the finite-state machine processes the personalization data and information according to an event triggered by a command sent to the microprocessor.

4. A method according to claim 3 wherein transitions from one state to another state of the finite-state machine are activated by at least one of the following events: personalization process enabling, security authentication, data sending and personalization completion.

5. A method according to claim 4 wherein each event is triggered by a set of commands sent to the integrated circuit card, the commands comprising at least one of enable personalization, verify personalization code, store personalization data and lock personalization.

6. A method according to claim 5 wherein the enable personalization command allows transition on a ready state so that the integrated circuit card is enabled to receive the commands specified for the data personalization.

7. A method according to claim 6 wherein the ready state is a transition state, and only the verify personalization code command is accepted.

8. A method for an entity different than a manufacturer of a smart card to perform a secure personalization phase of the semi-finished smart card, the smart card comprising a non-volatile memory storing an algorithm for processing data as a finite-state machine and enabling the entity different from the manufacturer of the smart card to access the algorithm for storing personalization data and information in the non-volatile memory required by the secure personalization phase, the method comprising:
performing a security authentication before enabling the algorithm to receive the personalization data and information;
enabling the algorithm to receive the personalization data;
storing the personalization data in secret memory locations in the non-volatile memory according to a data structure and an access procedure hidden to the entity different from the manufacturer of the integrated circuit card; and
repeating the enabling and storing if the personalization data and information were not correct.

9. A method according to claim 8 further comprising storing in the non-volatile memory different personalization commands corresponding to different memory locations.

10. A method according to claim 8 wherein the smart card comprises a microprocessor; and wherein the finite-state machine processes the personalization data according to an event triggered by a command sent to the microprocessor.

11. A method according to claim 10 wherein transitions from one state to another state of the finite-state machine are activated by at least one of the following events: personalization process enabling, security authentication, data sending and personalization completion.

12. A method according to claim 11 wherein each event is triggered by a set of commands sent to the smart card, the commands comprising at least one of enable personalization, verify personalization code, store personalization data and lock personalization.

13. A method according to claim 12 wherein the enable personalization command allows transition on a ready state so that the smart card is enabled to receive the commands specified for the data personalization.

14. A method according to claim 13 wherein the ready state is a transition state, and only the verify personalization code command is accepted.

15. An integrated circuit card comprising
a non-volatile memory for storing personalization data and information in secret allocations therein;
a microprocessor coupled to said non-volatile memory for performing a secure personalization phase of the integrated circuit card;
an algorithm stored in said non-volatile memory for processing data as a finite-state machine, the algorithm enabling an entity different from a manufacturer of the integrated circuit card to store the personalization data and information required by the secure personalization phase; and
said microprocessor for
performing security authentication before enabling said algorithm to receive the personalization data and information,
enabling said algorithm to receive the personalization data and information,
storing the personalization data and information in the secret allocations of said non-volatile memory according to a data structure and an access procedure hidden to the entity different from the integrated circuit card manufacturer, and
repeating the enabling and storing if the personalization data and information were not correct.

16. An integrated circuit card according to claim 15 wherein said non-volatile memory stores different personalization commands corresponding to different memory locations.

17. An integrated circuit card according to claim 15 wherein the finite-state machine processes the data according to an event triggered by a command sent to said microprocessor.

18. An integrated circuit card according to claim 17 wherein transitions from one state to another state of the finite-state machine are activated by at least one of the following events: personalization process enabling, security authentication, data sending and personalization completion.

19. An integrated circuit card according to claim 18 wherein each event is triggered by a set of commands sent to said microprocessor, the commands comprising at least one of enable personalization, verify personalization code, store personalization data and lock personalization.

20. An integrated circuit card according to claim 19 wherein the enable personalization command allows transition on a ready state so that said microprocessor is enabled to receive the commands specified for the data personalization.

21. An integrated circuit card according to claim 20 wherein the ready state is a transition state, and only the verify personalization code command is accepted.

22. A method for manufacturing an integrated circuit card comprising a non-volatile memory, the method comprising:
storing an algorithm in the non-volatile memory for processing data as a finite-state machine;
defining a data structure and an access procedure hidden to an entity different from a manufacturer of the integrated circuit card for storing personalization data and information in the non-volatile memory required by a secure personalization phase according to a designated application field of the integrated circuit card; and
storing in the non-volatile memory different personalization commands corresponding to different memory locations.

23. A method according to claim 22 wherein the integrated circuit card comprises a microprocessor; and wherein the finite-state machine processes the personalization data and information according to an event triggered by a command sent to the microprocessor.

24. A method according to claim 23 wherein transitions from one state to another state of the finite-state machine are activated by at least one of the following events: personalization process enabling, security authentication, data sending and personalization completion.

25. A method according to claim 24 wherein each event is triggered by a set of commands sent to the integrated circuit card, the commands comprising at least one of enable personalization, verify personalization code, store personalization data and lock personalization.

26. A method according to claim 25 wherein the enable personalization command allows transition on a ready state so that the integrated circuit card is enabled to receive the commands specified for the data personalization.

27. A method according to claim 26 wherein the ready state is a transition state, and only the verify personalization code command is accepted.

* * * * *